United States Patent Office 3,208,199
Patented Sept. 28, 1965

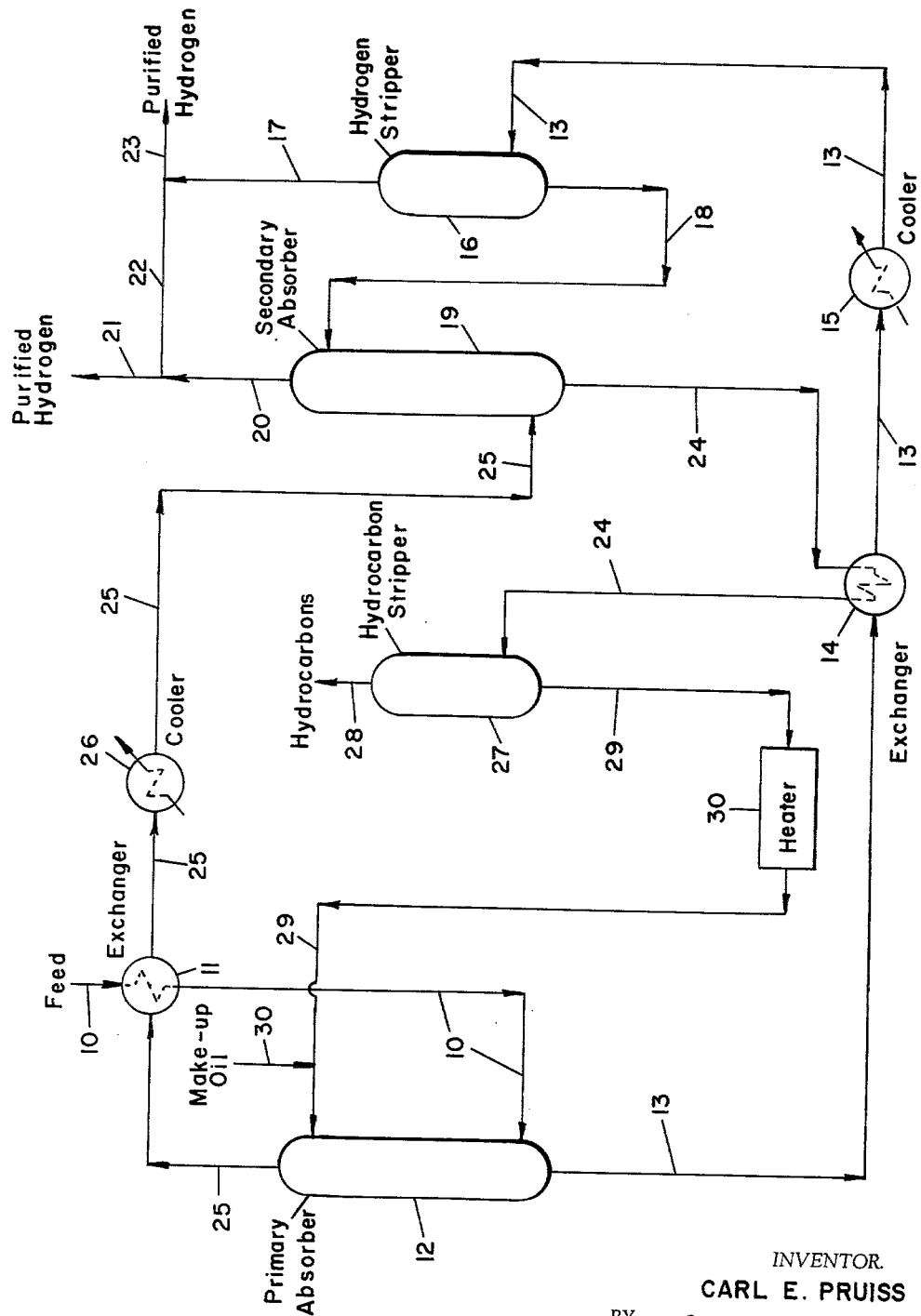

3,208,199
METHOD FOR RECOVERING HYDROGEN FROM LIGHT GASEOUS MATERIALS
Carl E. Pruiss, Wallingford, Pa., assignor to Sun Oil Company, Philadelphia, Pa., a corporation of New Jersey
Filed Oct. 16, 1962, Ser. No. 230,871
2 Claims. (Cl. 55—48)

This invention relates to the separation of gases. It particularly relates to a method for recovering a concentrated stream of hydrogen from a gaseous mixture. It especially relates to a method for separating hydrogen from methane.

In refinery practice, various processes commonly employed in refining petroleum products yield by-product gases containing hydrogen in admixture with methane and other light hydrocarbons, such as ethylene, ethan, propylene, propane, butenes, butadienes, butanes, and etc. Example of such processes are thermal cracking, catalytic cracking, catalytic reforming, various combinations of these processes, and the like. Concentration of hydrogen in these gases usually is too low to permit its use directly in other processes such as synthesis of ammonia, hydrogenation of edible fats, and the hydrotreating of lubricating oils. Therefore, it is desirable to separate and recover the hydrogen from such other gases for use in refinery operations.

The prior art procedure for separating components of refinery gases usually involves the use of an absorption step in which heavier components are, to an extent, selectively absorbed from the lighter components by means of an absorption medium, such as a light kerosene, followed by various stripping and reactivating steps for separating the absorbed components from each other. All of the prior art processes teach that all of the gases except hydrogen are absorbed in the absorption medium during the primary or first absorption step. Then, it has been the practice to selectively strip the lighter component or components from the rich absorption oil by means of a tower which is operated in such a manner so as to leave higher components dissolved in the oil. The partially-stripped oil is next introduced into a second tower where the heavier absorbed components are removed.

It is an object of this invention to provide a process for separating gases.

It is another object of this invention to produce high-purity hydrogen from gaseous fractions containing hydrogen and other low molecular weight gases.

A further object of this invention is to produce high-purity hydrogen from gaseous fractions containing hydrogen and other low molecular weight gases by a process involving a substantial saving in heating and cooling requirements.

Another object of this invention is to provide a method for concentrating hydrogen from gaseous mixtures containing hydrogan and low molecular weight hydrocarbons; sour gases, such as hydrogen sulfide and carbon dioxide; and inert gases, such as nitrogen, in a more economical and facile manner.

One embodiment of this invention relates to a method for concentrating hydrogen which comprises contacting the gaseous charge mixture containing hydrogen with an absorptive medium in a primary absorption zone under conditions of temperature and pressure adapted to absorb at least a major proportion of the hydrogen from said mixture, withdrawing from the primary absorption zone a hydrogen-lean gaseous mixture and a hydrogen-rich absorption medium, contacting the hydrogen-lean mixture in a secondary absorption zone with a hereinafter specified scrubbing medium under conditions of temperature and pressure adapted to absorb substantially all of the non-hydrogen gases, removing from the secondary absorption zone a non-hydrogen-gaseous-mixture-rich scrubbing medium and a concentrated hydrogen stream, stripping absorbed gases from the enriched scrubbing medium, returning the stripped scrubbing medium to said primary absorption zone as said absorption medium, stripping hydrogen from said hydrogen-rich absorption medium in a stripping zone, and removing from the stripping zone a concentrated hydrogen stream and a hydrogen-lean scrubbing medium.

The invention is more specifically illustrated in the accompanying drawing which is a diagrammatic flow sheet illustrating the preferred arrangement of apparatus for conducting the process.

Referring to the drawing, charge gas comprising by volume hydrogen 56%, methane 25%, ethane 9%, propane 3.5%, butanes and heavier 2.4%, hydrogen sulfide 3.6%, carbon dioxide 0.6%, and nitrogen 0.2% is fed through line 10 into the lower part of primary absorber 12 and passed upward therethrough countercurrently to a suitable absorption medium such as the usual absorption oil used in refinery practice which is introduced into the upper part of the tower by means of lines 29 and/or 30. Operating conditions within absorber 12 are maintained such as to effect absorption of at least a major proportion of the hydrogen present in the charge. From the top of tower 12 the unabsorbed gases, composed mainly of the light hydrocarbons, sour gases, and inerts, together with perhaps a minor amount of hydrogen, passes through line 25 and exchanges heat with the incoming feed in exchanger 11.

The hydrogen-lean gaseous mixture continues through line 25, is cooled in cooler 26, and passes into secondary absorber 19. In secondary absorber 19, the hydrogen-lean gaseous mixture is scrubbed with a hydrogen-lean scrubbing medium under conditions such as to effect absorption of substantially all of the gaseous components except residual hydrogen. A concentrated stream of hydrogen is removed from absorber 19 via line 20.

The scrubbing medium containing the absorbed gases, except hydrogen, passes from absorber 19 through line 24 into hydrocarbon stripper 27. The light hydrocarbons comprising methane, ethane, the propanes, the butanes and heavier, plus the hydrogen sulfide, carbon dioxide, and nitrogen, are removed from stripper 27 through line 28. The stripped scrubbing medium leaves stripper 27 via line 29, is heated in heater 30, and passes back into primary absorber 12 as the absorption medium.

The hydrogen-rich absorption oil passes from primary absorber 12 via line 13 through heat exchanger 14, wherein it gives up heat to the enriched scrubbing medium, through cooler 15 into hydrogen stripper 16. A concentrated stream of hydrogen is recovered from stripper 16 via line 17 and passes out to storage via line 23. Hydrogen-lean absorption medium leaves stripper 16 via line 18 and passes into secondary absorber 19 as the scrubbing medium.

If desired, purified hydrogen can be recovered from secondary absorber 19 directly through line 21, or it can be passed through line 22 for ultimate storage with the purified hydrogen coming from hydrogen stripper 16.

Again referring to the accompanying drawing, the following specific embodiment is offered to demonstrate the novel features of this invention:

The gaseous charge mixture containing hydrogen is pre-heated in exchanger 11 and sent into the hot or primary absorber tower 12 at a temperature between 400° and 1000° F., preferably between 600° and 800° F., and under a pressure between 200 and 3000 pounds per square inch, preferably 500 to 1200 pounds per square inch. Under these conditions the gases other than hydrogen have high volatility and low solubility and hydrogen has low volatility and high solubility in the absorption medium. The hot absorber oil containing dissolved hydrogen and small amounts of other gases leave the bottom of absorber 12 and are cooled first in exchanger 14, and secondly, in cooler 15 to a temperature between 50° and 200° F., preferably between 80° and 100° F., and passed into hydrogen stripper 16. Under these latter conditions the hydrogen has high volatility and low solubility; whereas, the other gases have low volatility and high solubility. Therefore, a concentration of hydrogen is readily effected in hydrogen stripper 16 by flash vaporization. The concentrated stream of hydrogen leaving stripper 16 via line 17 is approximately 95% hydrogen.

The relatively cool hydrogen-lean absorber oil is next sent to the cool or secondary absorber tower 19. The operating conditions in the secondary absorber 19 are adjusted to a temperature between 50° and 200 F., preferably between 80° and 100° F., and a pressure between 200 and 3000 pounds per square inch, preferably between 500 and 1200 pounds per square inch. Under these conditions the absorber oil is no longer able to dissolve hydrogen, but it does have an affinity for the other gases. Therefore, it acts as a scrubbing medium to remove the other gases from the minor amount of hydrogen present in the gaseous mixture coming into secondary absorber 19 via line 25. The enriched scrubber oil from secondary absorber 19 is next heated in exchanger 14 and sent to hydrocarbon stripper 27. The temperature in stripper 27 is maintained such that the oil is freed of the high volatility impure gases. It is to be noted, however, that any residual hydrogen contained in the absorber oil in stripper 27 is of low volatility, and is thereby substantially retained so that there is little or no hydrogen loss from the system.

The stripped scrubber medium is then heated in heater 30 and sent once again through the primary absorber tower 12 where the hydrogen is absorbed but the other gases are not.

From the above description it is seen that this invention is based on a process which uses a high-temperature oil to dissolve hydrogen from an impure hydrogen-bearing stream, whereby subsequent cooling of this stream springs the dissolved gas free in a highly purified state. It is also to be noted that hydrogen losses have been cut to an absolute minimum through the use of a two-stage scrubbing technique of the hydrogen-bearing gaseous mixture, to wit: the charge gaseous mixture is first washed with hot oil to dissolve the hydrogen from the other gases; the hydrogen-lean mixture is next scrubbed with cool oil to dissolve the other gases, but not residual hydrogen; followed by the intermediate springing of the gases from the respective absorbing medium.

As used herein, the term "non-hydrogen gaseous mixture" is intended to include all light gases, such as the light hydrocarbons, the sour gases and the inerts; but excludes any significant amount of hydrogen. Also as used herein, the gaseous mixture used as charge stock preferably comprises a mixture of hydrogen and methane; however, it is to be understood that the charge can comprise any gaseous mixture of hydrogen and low molecular weight gases. In any event, the gaseous charge mixture should predominate in hydrogen; it should contain more than 50% hydrogen on a weight basis, and preferably contain 65 to 95% hydrogen.

Generally, the absorption medium used herein can be a hydrocarbon ranging in type from butane to gas oil. It is to be noted; however, that the higher the boiling point of the oil, the lower its selectivity for hydrogen. In some cases, however, the heavier oils can be used and/or a blend of two dissimilar oils, such as gas oil with butane, can also be used. The basic criterion for the absorption medium is that it must be a liquid under the conditions used in the absorption zone.

I claim:
1. Method for concentrating hydrogen which comprises contacting a gaseous charge mixture containing hydrogen with a hydrocarbon absorption medium in a primary absorption zone at a temperature in the range of 400–1000° F. and a pressure in the range of 200–3000 p.s.i. to effect absorption of at least a major proportion of the hydrogen from said mixture, withdrawing from the primary absorption zone a hydrogen-lean gaseous mixture and a hydrogen-rich absorption medium, contacting the hydrogen-lean gaseous mixture in a secondary absorption zone with a hereinafter specified hydrocarbon scrubbing medium at a temperature in the range of 50–200° F. and a pressure in the range of 200–3000 p.s.i. to effect absorption of substantially all of the non-hydrogen gases, removing from the secondary absorption zone a non-hydrogen gaseous mixture-rich scrubbing medium and a concentrated hydrogen stream, stripping absorbed gases from the enriched scrubbing medium, returning the stripped scrubing medium to said primary absorption zone as said absorption medium, stripping hydrogen from the said hydrogen-rich absorption medium in a stripping zone, removing from the stripping zone a concentrated hydrogen stream and a hydrogen lean scrubbing medium, and returning the hydrogen-lean scrubbing medium to said secondary absorption zone as said hydrocarbon scrubbing medium.

2. Method according to claim 1 wherein the temperature and pressure in the primary absorption zone are, respectively, in the ranges of 600–800° F. and 500–1200 p.s.i. and the temperature and pressure in the secondary absorption zone are, respectively, in the ranges of 80–100° F. and 500–1200 p.s.i.

References Cited by the Examiner

UNITED STATES PATENTS

| 1,706,707 | 3/29 | Reilly et al. | 55—68 X |
|---|---|---|---|
| 1,836,659 | 12/31 | Gordon | 55—43 |
| 1,933,734 | 11/33 | Hornung | 55—48 X |
| 1,938,087 | 12/33 | Pier et al. | 55—68 X |
| 2,685,941 | 8/54 | Kassel | 55—46 X |
| 2,870,868 | 1/59 | Eastman et al. | 55—48 X |
| 2,880,591 | 4/59 | Kwauk | 55—48 X |
| 2,894,037 | 7/59 | Kindler | 55—48 |
| 3,026,683 | 3/62 | Palazzo et al. | 55—50 X |
| 3,102,012 | 8/63 | Dowd | 55—48 X |

REUBEN FRIEDMAN, *Primary Examiner.*